United States Patent Office 3,709,931
Patented Jan. 9, 1973

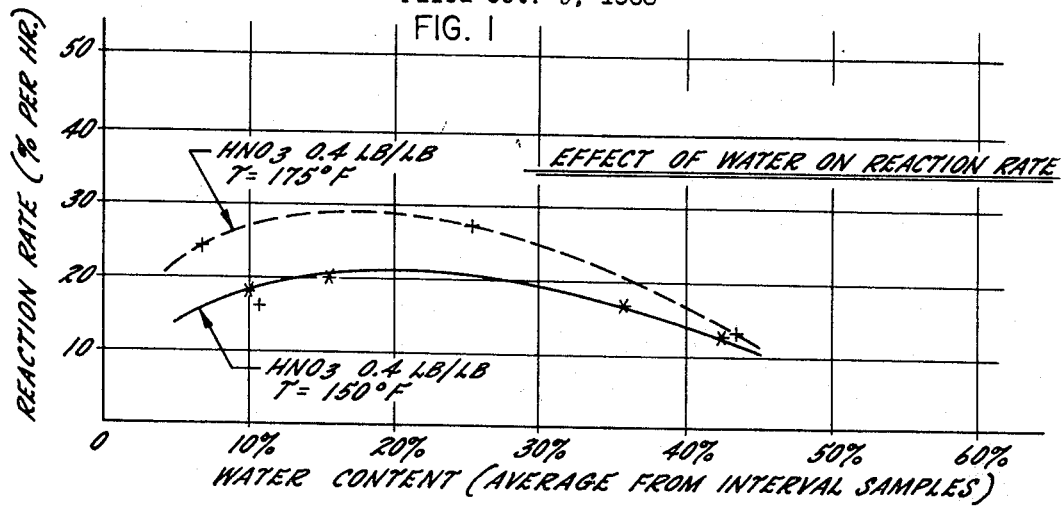
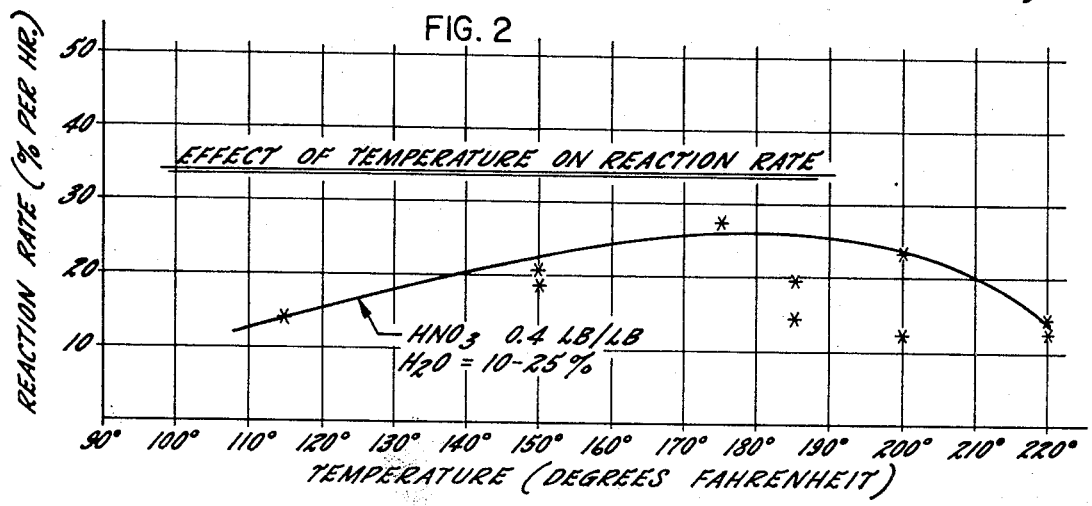
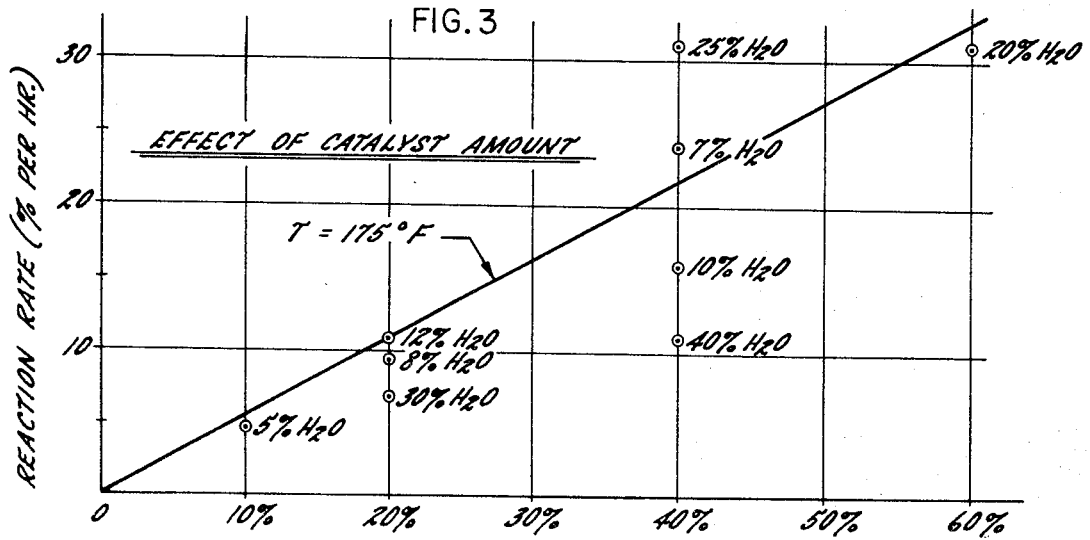

3,709,931
OXIDATION PROCESS EMPLOYING NITRIC ACID CATALYSIS FOR THE PREPARATION OF HUMATES FROM COAL
Wayne A. Proell, Seymour, Ind., and Clifford E. Selin and Stanford T. Holbrook, Salt Lake City, and Francis H. Hammond, Bountiful, Utah, assignors to American Hydrocarbon Company, Salt Lake City, Utah
Filed Oct. 9, 1968, Ser. No. 766,163
Int. Cl. C07c *63/00*
U.S. Cl. 260—515 H
9 Claims

ABSTRACT OF THE DISCLOSURE

An oxidation process employing nitric acid catalysis for the preparation of humates and other organic chemicals from coal. The process comprises the steps of introducing oxygen and a catalytic amount of nitric acid into a reactor containing a pulverized coal, to which 5% to 35% of moisture and 25% of the total amount of nitric acid to be employed has been admixed, maintaining the temperature of this reactor at between about 150° F. to about 225° F., terminating the reaction within at least ten hours and recovering humates and other organic chemicals.

---

The present invention relates to an improved method of oxidizing coal and coal-like substances to produce useful organic chemicals, for example, the so-called humic acids. More particularly, the invention relates to an improved catalytic oxidation process whereby finely divided coal is subjected to the action of oxygen in the presence of nitric acid to produce high yields of such chemicals at relatively low temperatures and in short periods of time.

The prior art reveals that while various oxidation processes for the preparation of humic acids from coal have been proposed, there has been almost no commercial activity along this line. The various processes described in the art have, in general, involved very high temperatures, high pressures or excessive reaction times and often all three. As such, the processes were either too inefficient or economically unfeasible to be of commercial importance. A process for the production of humic acids from coal or coal-like materials, to be commercially feasible, should produce high yields of the product at relatively low temperatures, in short reaction times and, preferably, at atmospheric pressure. The present invention accomplishes these desired goals.

It is an object of the present invention to provide a process for converting coal of various ranks to useful organic chemicals and, in particular, to humic acids having utility in agriculture as a soil enrichment adjuvant and in other fields. Another object is to provide the art with an improved coal oxidation process whereby coals of various types can be converted to both acid soluble and alkali soluble products in short periods of time under relatively mild conditions.

Still further objects of the present invention are to produce humic acids and similar materials which can be combined chemically or physically with various known soil enrichment components to provide products having the properties of both fertilizer and humus adjuvant. More particularly, materials produced in accordance with the present invention may either be admixed with commercially available fertilizers or fertilizing substances or the same can be reacted with various nitrogen, phosphorus, or potassium containing chemicals to produce highly effective soil additives. Various trace elements needed by the soil can also be chemically combined with the materials produced in accordance with the invention.

It is to processes of converting coal to useful humic acids and other organic chemicals having a wide range of applicability in agriculture and other industries that the present invention is primarily directed. It will be understood, however, that the oxidation process which is herein described has applicability to other organic materials such as peat and lignite.

The type of coal to which people have applied oxidation in an effort to obtain humic acids has varied widely. It is generally recognized, however, that the lignitic and sub-bituminous coals are the most useful sources of humic acid-like materials. It is to such coals that the present invention has particular applicability.

In accordance with the present invention, it is preferred to employ the lower rank coal, that is, from lignite through high-rank bituminous. Low rank semi-bituminous and high rank semi-bituminous coals can also be oxidized in accordance with this process, but with greater difficulty.

The art has long recognized that the oxidation of coal generally results in a reaction product which is separable into acid-soluble and alkali-soluble fractions. The latter fraction comprises the humic acids. In the instant process a primary object has been the maximization of alkali solubles in the total oxidation product in the shortest reaction time and under the mildest possible conditions.

In accordance with the present invention, ground or powdered coals, preferably of a lower rank are mixed with an amount of water sufficient to wet the coal and preferably not more than about five to about twenty-five percent by weight of the coal. Preferably the water is first mixed with the coal and the wetted coal is then placed in a reactor provided with adequate agitation, which reactor is designed to maintain the coal in the range of from about 150° F. to about 225° F. Because the oxidation of coal is an exothermic reaction, the reactor must also be provided with a means, preferably by indirect heat exchange, for controlling the temperature within the reactor. When the temperature of the coal within the reaction zone has been raised to the desired temperature, there is then introduced in accordance with the present invention a stream of oxygen-containing gas which can be preferably either pure oxygen or air and a catalytic amount of $HNO_3$. The oxygen and nitric acid are preferably introduced over the entire period of reaction, which in accordance herewith is usually not more than about ten hours and preferably less. It may, of course, be carried out for longer periods but it is usually uneconomical or, indeed, detrimental to the product to do so.

The invention will be more fully understood by reference to the attached figures in which:

FIG. 1 illustrates the effect of the water content of humate product upon the reaction rate.

FIG. 2 illustrates the effect of temperature upon the reaction rate.

FIG. 3 illustrates the effect of catalyst (nitric acid) concentration upon the reaction rate.

It has been found that the temperature range over which at least about 35% alkali solubles can be produced in not more than about four hours is from about 150° F. to about 225° F., and preferably from about 175° F. to about 200° F. While it has been found that useful oxidation does occur up to 225° F., it has also been found that yields of the desired products fall off at such temperatures, as is shown in Examples 3 and 7 of this application. The effect of temperature upon reaction rate is shown in FIG. 3.

The concentration of the nitric acid employed in accordance herewith does not appear to be especially critical. Nitric acid of 70% strength (concentrated) has been used most often with good results, but either more concentrated or more dilute acid may be employed. Since the coal is wet, it will be apparent that the concentration of the acid initially employed is changed once it becomes admixed with the wet coal. The criteria appears to be that of maintaining the wetted coal in a pH range of about 0.5 to about 5. It has been found that the manner in which the nitric acid is brought into contact with the coal is very important. Thus, it has been found that it is desirable to pre-mix about 25% of the total amount of nitric acid to be added with the coal; the remaining nitric acid is then incrementally introduced throughout the reaction period, after the coal has reached the reaction temperature. It has been found that this nitric acid and oxygen process is somewhat less effective as an oxidation system than the oxygen and nitrogen dioxide system described in a co-pending application. A high proportion of alkali soluble products can be obtained with either system, but it takes significantly longer to do so when nitrogen dioxide or an equivalent is not introduced, all other variables remaining essentially constant.

The amount of nitric acid on a 100% basis which is added in accordance herewith will vary from 0.1 pounds of acid per pound of coal charged to about 0.6. Preferably, an amount of from about 0.3 to about 0.5 pound of acid per pound of coal charged is employed. FIG. 3 is an illustration of the effect that the concentration of the nitric acid catalyst has upon the reaction rate.

It has been found that in order to achieve the relatively low temperature, rapid oxidation in accordance herewith, that it is necessary to maintain a substantial amount of moisture in the reaction zone. Not only does the presence of this moisture serve to lessen the possibility of an explosion occurring, as is sometimes encountered with a dry system, but it also has the effect of optimizing the reaction rate. In general, as seen in FIG. 1, it has been found that there should be present an amount of water equal from about 5 to about 35% of the weight of the coal and preferably from about 5% to 25%.

When operating at atmospheric pressure and temperatures approaching the boiling point of water, it is usually necessary, in order to maintain the desired moisture content in the reaction zone, to introduce additional water during the course of the reaction. This can be accomplished by introducing steam or liquid water into the reactor.

It has been found that it is not necessary to separate the alkali soluble fraction (humic acids) from the other oxidation products of the herein-described process in order to achieve maximum soil enrichment. Therefore, the oxidation products obtained in accordance herewith may be directly admixed with soil as an enriching adjuvant without first separating the alkali-soluble fraction (humic acids) and then using this fraction as the soil enrichment adjuvant. It has been found that when beans are planted in soil containing 0.1 to 0.25% by weight of oxidation products obtained in accordance herewith their growth, up to first fruiting, is noticeably increased over beans grown in untreated soil. Increases in growth (as measured by weight increase) as high as 35% have been achieved. Humate material obtained in accordance with the herein-described process is also suitable for use in any of the applications of humates suggested in the prior art such as in animal feed, in oil drilling muds, etc.

The novel oxidation process of the invention herein described can be further illustrated by means of the following examples which are not intended as limitations on the scope of the invention. In the following examples the amout of alkali solubles is intended to refer directly to the amount of humic acids produced in each run. In the examples, reference is made to both the alkali and acid solubilities of the coals and to the alkali and acid solubilities of the products resulting from the oxidation. These solubility determinations were performed as follows:

ACID SOLUBILITY

A sample of the material to be analyzed was dried. A 0.5 gram sample thereof was extracted with 100 ml. of 0.2 N acetic acid by stirring for two hours at 165° F. The insolubles were filtered off, washed, dried and weighed. The difference in weight between the original dried sample and the dried residue gives the weight of acid soluble materials.

ALKALI SOLUBILITY

A sample of the material to be analyzed was dried. A 0.5 gram sample thereof was extracted for two hours with 100 ml. of 1 N NaOH by stirring at 165° F. The insolubles were filtered off, washed, dried and weighed. The difference in weight between the original dried sample and the dried residue gives the total weight of alkali soluble material.

In the examples illustrated below, coal obtained from the Coalville, Utah area was first subjected to a hammermill pulverization and then to either a rod-milling or ball-milling operation to render the same very finely divided. The size of the pulverized coal from a rod-milling operation was 90% below 400 mesh, but from a ball-milling operation it was 95% below 400 mesh. The hammer-mill pulverized coal is 90% below 100 mesh. A typical Coalville coal is of sub-bituminous rank and analyzed, on an ash-free basis, 73.9% carbon, 5.3% hydrogen, 1.70% nitrogen and 18.8% oxygen when received. It has been found that this coal when pulverized and treated with a mineral acid at room temperature, e.g., phosphoric acid, will yield from 10 to 15% alkali solubles without even subjecting the same to the herein described oxidation process. It is believed that this is a result of releasing the acids from naturally occurring humates in the coal. In all analyses of the oxidation products of such coal which are described herein, the total alkali solubility of the products has been corrected for 14% humic acid obtained in this manner. The percentage of total alkali soluble material in the product, in each example, was, therefore, actually about 14% higher than is given, but since it is desired, in these examples, to accurately reflect the result of the oxidation process of this invention, that 14% has been subtracted in each case. All the coals in the following examples contained about 8% of moisture immediately after being pulverized and before being subjected to the indicated treatment.

The percentage moisture content of the sample runs in the following examples was determined empirically by conventional chemical methods. In the examples, reference is made to the parameters "reaction rate" and "catalyst use." The "reaction rate" is defined as the rate of production of alkali solubles and expressed in percent production per hour of reaction run. That is, reaction rate equals percent alkali solubles produced per hour. It is determined by dividing the maximum value for alkali solubility prior to the point after which the alkali solubility does not increase by 5% in one half hour of run time by the elapsed reaction time for this run sample. This value is useful for, among other things, determining the efficiency of the reaction system. "Catalyst use" is defined as the amount of catalyst, expressed in pounds, needed to produce one pound of humic acids (alkali soluble materials). It is determined by dividing the total weight of catalyst used by the total weight of humic acids produced, at the same point in the oxidation as the reaction rate is measured. The total weight of humic acids produced is in turn determined by multiplying the weight of coal charged by the maximum value for the alkali solubles obtained. It is to be noted that one pound of coal charged should yield about one pound of humic acid when oxidized since the loss of water and carbon dioxide should be balanced by the uptake of oxygen and nitro groups.

Example 1

Seven pounds of ball-milled Coalville coal were introduced into a water-jacketed reactor fitted with both internal rotary stirring and wall-scraping mechanisms. The reactor was also designed to be rocked along its logitudinal axis when in use. Oxygen was introduced into the top of the reactor at the rate of 1.70 pounds per hour. During the course of the reaction an amount of concentrated nitric acid equal to 0.40 pound of acid per pound of coal charged was incrementally introduced. Water present in the acid is estimated as 0.84 pound. During the same period, the water condensed from the gaseous products was removed and totaled 0.78 pound. The temperature of the reaction zone was maintained in the range of 148° F. to 153° F. over the four hour period of reaction. Samples removed at one-half hour intervals over the course of the reaction were analyzed for water content, acid and alkali solubility. Set forth below in Table 1 are the results of such analyses. The solubility data for 0.0 hr. is that of the starting material, and is based on percentage of a dried sample.

TABLE 1

| Time (hrs.) | Percent | | |
|---|---|---|---|
| | Acid sol. | Alkali sol.[1] | Moisture |
| 0.0 | 0.3 | 1.4 | 0.3 |
| 0.5 | 3.2 | 0.5 | 6.2 |
| 1.0 | 3.2 | 18.1 | 8.7 |
| 1.5 | 1.8 | 16.7 | 10.1 |
| 2.0 | 7.2 | 33.3 | 11.4 |
| 2.5 | 5.1 | 46.2 | 13.6 |
| 3.0 | 8.1 | 46.9 | 15.6 |
| 4.0 | 12.7 | 51.2 | 12.7 |

[1] All alkali solubles corrected for leonardite.

In this example the catalyst use was 0.51 lb. HNO₃ (anhydrous) per lb. product (2.5 hrs.), the reaction rate was 18 percent product per hour and the average moisture was 9.8 percent.

Example 2

Seven pounds of ball-milled Coalville coal were introduced into the reactor as in Example 1. Oxygen was introduced into the top of the reactor at the rate of 1.70 pounds per hour. During the course of the reaction an amount of concentrated HNO₃ equal to 0.4 pound of acid per pound of coal charged was incrementally introduced as well as 0.5 pound of water. The acid itself carried in an estimated 0.84 pound of water. During the same period, the water condensed from the gaseous products was removed and this totaled 1.06 pounds. The temperature in the reaction zone was maintained in the ranged of 172° F. to 175° F. over the four hour period of reaction. Samples removed at one-half hour intervals over the course of the reaction were analyzed for moisture, acid and alkali solubility. Set forth below in Table 2 are the results of such analyses:

TABLE 2

| Time (hrs.) | Percent | | |
|---|---|---|---|
| | Acid sol. | Alkali sol.[1] | Moisture |
| 0.0 | −1.5 | 0.0 | 0.0 |
| 0.5 | 0.5 | 4.4 | 4.4 |
| 1.0 | 0.7 | 5.6 | 5.6 |
| 1.5 | 5.2 | 22.0 | 7.5 |
| 2.0 | 4.6 | 21.3 | 7.9 |
| 2.5 | 8.9 | 59.9 | 9.6 |
| 3.0 | 9.2 | 64.4 | 9.1 |
| 4.0 | 8.7 | 58.0 | 10.4 |

In this example the catalyst use was 0.40 lb. HNO₃ (anhydrous) per lb. product (2.5 hours), the reaction rate was 24 percent product per hour, and the average moisture was 6.8 percent.

Example 3

Seven pounds of ball-milled Coalville coal were introduced into the reactor as in Example 1. Oxygen was introduced into the top of the reactor at the rate of 0.80 pound per hour. Along with this oxygen, an amount of concentrated HNO₃ (70%) equal to 0.4 pound of acid per pound of coal charged was incrementally introduced during the course of the reaction. Water totaling 2.26 pounds was also added during the course of the reaction by introducing steam into the bottom of the reactor. During the same period, the water condensed from the gaseous products was removed and this totaled 3.7 pounds. The temperature in the reaction zone was maintained in the range of 208° F. to 226° F. over the four hours period of reaction. Samples removed at on-half hour intervals over the course of the reaction were analyzed for moisture, acid and alkali solubility. Set forth below in Table 3 are the results of such analyses:

TABLE 3

| Time (hrs.) | Percent | | |
|---|---|---|---|
| | Acid sol. | Alkali sol. | Moisture |
| 0.0 | −0.6 | 0.9 | 10.7 |
| 0.5 | 0.5 | 6.8 | 6.8 |
| 1.0 | 1.4 | 13.1 | 5.2 |
| 1.5 | 2.4 | 20.5 | 5.1 |
| 2.0 | 2.9 | 21.2 | 4.3 |
| 2.5 | 3.2 | 36.3 | 4.5 |
| 3.0 | 6.4 | 42.2 | 4.9 |
| 3.5 | 8.0 | 41.4 | 5.7 |
| 4.0 | 8.5 | 45.6 | 6.6 |

In this example the catalyst use was 0.67 lb. HNO₃ (anhydrous) per lb. product (3.0 hrs.), the reaction rate was 14 percent product per hour, and the average moisture was 6.1 percent.

Example 4

Seven pounds of ball-milled Coalville coal were introduced into the reactor as in Example 1. Oxygen was introduced into the top of the reactor at the rate of 0.84 pound per hour. During the course of the reaction an amount of nitric acid equal to 0.2 pound of acid per pound of coal charged was incrementally introduced, carrying in with it 0.45 pound of water. During the second period, the water condensed from the gaseous products was removed and this totaled 0.41 pound. The temperature in the reaction zone was maintained at 171° F. to 175° F. over the four hour period of reaction. Samples removed at one-half hour intervals over the course of the reaction were analyzed for moisture, acid and alkali solubility. Set forth below in Table 4 are the results of such analyses:

TABLE 4

| Time (hrs.) | Percent | | |
|---|---|---|---|
| | Acid sol. | Alkali sol. | Moisture |
| 0.0 | 4.7 | 0.0 | 0.0 |
| 0.5 | 6.7 | 2.1 | 3.7 |
| 1.0 | 6.1 | 6.3 | 5.2 |
| 1.5 | 4.9 | 11.9 | 6.2 |
| 2.0 | 5.9 | 14.6 | 7.2 |
| 2.5 | 6.3 | 23.1 | 7.9 |
| 3.0 | 7.8 | 30.2 | 8.2 |
| 4.0 | 6.7 | 34.4 | 7.9 |

In this example the catalyst use was 0.47 lb. HNO₃ (anhydrous) per lb. product (at 3 hrs.); the reaction rate was 10.0% product per hour, and the average moisture was 6.1%.

Example 5

Seven pounds of ball-milled Coalville coal were introduced into the reactor as in Example 1. Oxygen was introduced into the top of the reactor at the rate of 0.64 lb. per hour. During the course of the reaction the amount of concentrated nitric acid equal to 0.1 lb. of acid per lb. of coal charge was incrementally introduced. During the same period, the water condensed from the gaseous products was removed and this totaled 0.10 lb. The temperature in the reaction zone was maintained in the range of 171° F. to 175° F. over the four hour period of reaction. Samples removed at one-half hour intervals over the course of the reaction were analyzed for moisture, acid and alkali solubility. Set forth in Table 5 are the results of such analyses:

TABLE 5

| Time (hrs.) | Percent | | |
|---|---|---|---|
| | Acid sol. | Alkali sol. | Moisture |
| 0.0 | 1.5 | 0.0 | 0.3 |
| 0.5 | 5.3 | 0.0 | 0.9 |
| 1.0 | 4.1 | 0.0 | 4.3 |
| 1.5 | 1.5 | 1.5 | 4.7 |
| 2.0 | 2.7 | 1.9 | 4.8 |
| 2.5 | 1.5 | 7.7 | 4.7 |
| 3.0 | 2.2 | 13.9 | 6.9 |
| 4.0 | 2.2 | 12.5 | 6.0 |

In this example the catalyst use was 0.50 lb. $HNO_3$ (anhydrous) per lb. product (3 hrs.), the reaction rate was 4.6 product per hour and the average moisture was 4.1%.

Example 6

Seven pounds of ball-milled Coalville coal were introduced into the reactor as in Example 1. Oxygen was introduced into the top of the reactor at the rate of 1.60 lbs. per hour. During the course of the reaction, an amount of concentrated nitric acid equal to 0.60 lb. of acid per lb. of of coal charged was incrementally introduced as well as additional water totaling 3 lbs. During the same period, the water condensed from the gaseous products was removed and this totaled 4.6 lbs. The temperature in the reaction zone was maintained in the range of 173° C. to 176° F. over the four hour period of reaction. Samples removed at one-half hour intervals over the course of the reaction were analyzed for moisture, acid and alkali solubility. Set forth below in Table 6 are the results of such analyses:

TABLE 6

| Time (hrs.) | Percent | | |
|---|---|---|---|
| | Acid sol. | NaOH sol. | Moisture |
| 0.0 | 4.1 | 0.0 | 12.4 |
| 0.5 | 6.2 | 5.2 | 14.5 |
| 1.0 | 9.7 | 13.1 | 16.5 |
| 1.5 | 9.7 | 36.1 | 16.6 |
| 2.0 | 11.9 | 56.1 | 18.0 |
| 2.5 | 14.8 | 77.5 | 17.6 |
| 3.0 | 15.1 | 75.1 | 19.6 |
| 3.5 | 19.1 | 75.6 | 25.9 |
| 4.0 | 20.2 | 70.2 | 25.8 |

In this example the catalyst use was 0.39 lb. $HNO_3$ (anhydrous) per lb. product (2.5 hrs.), the reaction rate was 31.0% per hour and the average moisture was 18.4%.

Example 7

Seven pounds of ball-milled Coalville coal were mixed with 3.55 pounds of water and introduced into the reactor as in Example 1. Oxygen was introduced into the top of the reactor at the rate of 1.60 lbs. per hour. During the course of the reaction, an amount of concentrated nitric acid (70%) equal to 0.20 lb. of acid per lb. of coal charged was incrementally introduced. During this same period, the water condensed from the gaseous products was removed and totaled 0.20 lb. The temperature in the reaction zone was maintained in the range of 100–102° F. over the four hour period of reaction. Samples were removed at one-half hour intervals over the course of the reaction and analyzed for moisture and alkali solubility. Set forth in Table 7 are the results of such analyses:

TABLE 7

| Time (hrs.) | Percent | |
|---|---|---|
| | Alkali sol. | Moisture |
| 0.0 | 6.5 | 43.1 |
| 0.5 | 0.0 | 43.1 |
| 1.0 | 0.0 | 44.5 |
| 1.5 | 4.3 | 43.4 |
| 2.0 | 7.3 | 40.4 |
| 2.5 | 16.0 | 40.7 |
| 3.0 | 23.3 | 40.8 |
| 4.0 | 19.9 | 46.3 |

In this example the catalyst use was 0.61 lb. $HNO_3$ (anhydrous) per lb. of product (3.0 hrs.), the reaction rate was 7.7% per hour and the average moisture was 42.8%.

While certain representative embodiments and details have been shown for the purpose of illustrating the invention, it will be apparent to those skilled in this art that various changes and modifications may be made therein without departing from the spirit or scope of the invention.

We claim as our invention:
1. The process of oxidifiing coal which comprises:
   (a) pulverizing the coal;
   (b) admixing the pulverized coal with from about 5 to about 35% by weight water to wet the coal;
   (c) introducting the wetted coal into a reaction zone;
   (d) maintaining said reaction zone at a temperature in the range of between about 150° F. to about 225° F.;
   (e) agitating the wetted coal in said reaction zone at such temperatures;
   (f) introducing oxygen and nitric acid in an amount of from about 0.1 to about 0.6 pound of nitric acid per pound of coal into said reaction zone;
   (g) maintaining said reaction zone at a pressure not substantially above atmospheric;
   (h) removing the gaseous products of reaction from the reaction zone;
   (i) terminating the oxidation reaction in not more than about ten hours; and
   (j) recovering the oxidation products.
2. The process of claim 1 wherein nitric acid is admixed with the coal at the time the same is admixed with water.
3. The process of claim 1 wherein the quantity of water admixed with the coal is from about 5% to about 25% by weight.
4. The process of claim 1 wherein additional water is introduced into the reaction zone during the oxidation.
5. The process of claim 1 wherein the temperature in the reaction zone is maintained at a range from about 175° F. to about 200° F.
6. The process of claim 1 wherein the amount of nitric acid introduced into the reaction zone is from about 0.3 to about 0.5 pound of nitric acid per pound of coal charged.
7. The process of oxidizing coal which comprises:
   (a) pulverizing the coal;
   (b) admixing a substantial amount of water with the pulverized coal not in excess of about 35% by weight of the coal;
   (c) introducting the wetted coal into a reaction zone;
   (d) maintaining said reaction zone at a temperature below the boiling point of water;
   (e) agitating the wetted coal in said reaction zone at such temperatures;
   (f) introducing oxygen and nitric acid in an amount of from about 0.1 to about 0.6 pound of nitric acid per pound of coal;
   (g) maintaining said reaction zone at a pressure that is not substantially above atmospheric;
   (h) removing the gaseous products from the reaction zone;
   (i) terminating the oxidation reaction in not more than ten hours; and
   (j) recovering the oxidation products.
8. The process of oxidizing coal which comprises agitating pulverized coal in an admixture with from about 5% to about 35% by weight of water in a reaction zone, maintaining a temperature in said reaction zone in the range of from about 150° F. to about 225° F., introducing into said reaction zone oxygen and nitric acid in an amount of from about 0.1 to about 0.6 pound of nitric acid per pound of coal, maintaining said reaction zone at a pressure not substantially above atmospheric, terminating the reaction within ten hours and recovering humic acids.

9. The process of claim 1 wherein the nitric acid is introduced into the reaction zone incrementally during the oxidation.

References Cited

UNITED STATES PATENTS 2,555,410  6/1951  Howard ............ 260—515

OTHER REFERENCES

Kinney et al.: Indust. & Eng. Chem., vol. 48, No. 2 (February 1956), pp. 327–332.

Juettner et al.: Industrial and Engineering Chemistry, vol. 44 (1952), pp. 1409–11.

JAMES A. PATTEN, Primary Examiner.